(12) United States Patent
Antoku (10) Patent No.: US 7,474,509 B2
(45) Date of Patent: Jan. 6, 2009

(54) MAGNETIC RECORDING APPARATUS WITH HEAD ARM HOLDING PART

(75) Inventor: Yosuke Antoku, Chuo-ku (JP)

(73) Assignee: TDK Corporation, Tokyo (JP)

( * ) Notice: Subject to any disclaimer, the term of this patent is extended or adjusted under 35 U.S.C. 154(b) by 432 days.

(21) Appl. No.: 11/149,314

(22) Filed: Jun. 10, 2005

(65) Prior Publication Data
US 2006/0023366 A1 Feb. 2, 2006

(30) Foreign Application Priority Data
Jul. 28, 2004 (JP) .............................. 2004-220637

(51) Int. Cl.
G11B 5/54 (2006.01)
G11B 5/33 (2006.01)

(52) U.S. Cl. ................................. 360/254.8; 360/256.2

(58) Field of Classification Search ........ 360/254.7–255, 360/255.6–255.9, 256.2
See application file for complete search history.

(56) References Cited

U.S. PATENT DOCUMENTS

| | | | | |
|---|---|---|---|---|
| 4,490,815 A * | 12/1984 | Umehara et al. | ............... | 369/43 |
| 4,496,887 A * | 1/1985 | Ichihara et al. | ............... | 318/254 |
| 4,497,722 A * | 2/1985 | Tsuchida et al. | ......... | 252/62.54 |
| 4,543,382 A * | 9/1985 | Tsuchida et al. | ............ | 524/267 |
| 5,072,321 A * | 12/1991 | Kanai et al. | ............... | 360/99.04 |
| 5,128,818 A * | 7/1992 | Koizumi et al. | .......... | 360/99.04 |
| 5,481,418 A * | 1/1996 | Maikuma et al. | ............... | 360/85 |
| 5,657,190 A * | 8/1997 | Araki et al. | .................. | 360/324 |
| 5,796,561 A * | 8/1998 | Mauri | .................... | 360/324.11 |
| 6,067,209 A * | 5/2000 | Aoyagi et al. | ............. | 360/254.7 |
| 6,078,474 A * | 6/2000 | Koyanagi et al. | ........ | 360/254.8 |
| 6,160,686 A * | 12/2000 | Albrecht et al. | .......... | 360/255.6 |
| 6,195,225 B1 * | 2/2001 | Komatsu et al. | ......... | 360/99.01 |
| 6,317,287 B1 * | 11/2001 | Yano et al. | ................... | 360/260 |
| 6,424,501 B1 * | 7/2002 | Tsujino et al. | ........... | 360/254.7 |
| 6,900,956 B2 * | 5/2005 | Kitahori et al. | ............... | 360/66 |
| 2001/0015875 A1 * | 8/2001 | Ohta et al. | ............... | 360/254.8 |
| 2006/0268462 A1 * | 11/2006 | Ohwe | ...................... | 360/254.8 |
| 2006/0273673 A1 * | 12/2006 | Yamamura et al. | ............ | 310/90 |

FOREIGN PATENT DOCUMENTS

| | | |
|---|---|---|
| JP | A-62-141617 | 6/1987 |
| JP | A-09-102109 | 4/1997 |
| JP | A 11-345471 | 12/1999 |
| JP | A 2002-150510 | 5/2002 |

* cited by examiner

Primary Examiner—Brian E Miller
(74) Attorney, Agent, or Firm—Oliff & Berridge, PLC (57) ABSTRACT

A magnetic recording apparatus comprises a magnetic disk; a magnetic head, including a magnetoresistive device, for reading information from the magnetic disk; an arm attached to the magnetic head and swings so as to load and unload the magnetic head to or from the magnetic disk; a magnetic field applying part disposed close to the magnetic disk, made of a magnetic material, and formed with a groove for surrounding the magnetic head; and a holding part for holding the arm such that the unloaded magnetic head stays at a position surrounded by the groove; whereas the magnetic material contains a plastic magnet.

4 Claims, 9 Drawing Sheets

MAGNETIC RECORDING APPARATUS WITH HEAD ARM HOLDING PART

BACKGROUND OF THE INVENTION

1. Field of the Invention

The present invention relates to a magnetic recording apparatus such as a magnetic disk drive.

2. Related Background of the Invention

As magnetic recording apparatus, those employing magnetic recording media such as magnetic disks with magnetic heads using magnetoresistive devices have widely been in use. It is necessary for these magnetic recording apparatus to have an excellent resistance against external shocks, prevent malfunctions such as read errors from occurring, and so forth.

Therefore, a magnetic recording apparatus equipped with a so-called load/unload mechanism which holds a magnetic head in a state unloaded from a magnetic recording medium when not operated and loads the magnetic head again at the time of operation in order to improve the shock resistance of the magnetic recording apparatus has been known (see, for example, Japanese Patent Application Laid Open No. HEI 11-345471).

Further, a magnetic recording apparatus employing a method of applying a magnetic field to an unloaded magnetic head so as to remagnetize the magnetic head in order to suppress the occurrence of Barkhausen noise in the magnetic recording apparatus and prevent read errors from happening has been proposed (see, for example, Japanese Patent Application Laid-Open No. 2002-150510).

SUMMARY OF THE INVENTION

In recent years, the use of magnetic recording apparatus in car-mounted systems such as car navigation systems and various portable devices such as cellular phones and digital cameras has rapidly been spreading. The magnetic recording apparatus used for these purposes are required to keep stable operations in severer environments in terms of temperature changes and the like than those used in personal computers, etc.

However, there have been cases where the conventional magnetic recording apparatus cause changes in output characteristics such as decreases in output and disorders in the symmetry of output waveforms in the magnetic head when used in a severe environment accompanying a large fluctuation in temperature. Such changes in output characteristics are likely to result in read errors and the like from magnetic recording media, whereby stable operations are harder to attain.

The inventors conducted studies in order to address this problem and have found that output characteristics such as decreases in output and disorders in the symmetry of output waveforms in a magnetic head can be suppressed when the state of magnetization of the magnetic head is stabilized by employing a method of applying a magnetic field to an unloaded magnetic head.

However, for employing this method in an actual magnetic recording apparatus, it has been found necessary to mount a member for applying the magnetic field within a limited space in the apparatus, whereas the magnetic field generated by this member may magnetically affect magnetic recording media or the like, and so forth, which are problems to be solved in order to achieve practical uses.

In view of the foregoing circumstances, it is an object of the present invention to provide a magnetic recording apparatus which, while using a member mountable within a limited space in the apparatus, fully suppresses changes in output characteristics of a magnetic head without magnetically affecting the other members so much.

In one aspect, the present invention provides a magnetic recording apparatus comprising a magnetic recording medium; a magnetic head, including a magnetoresistive device, for reading information from the magnetic recording medium; a load/unload mechanism for loading and unloading the magnetic head to or from the magnetic recording medium; and a magnetic field applying part, made of a magnetic material, for applying a magnetic field to the unloaded magnetic head; wherein the magnetic material contains a plastic magnet.

In the magnetic recording apparatus of the present invention, a magnetic field applying part including a plastic magnet is provided, so as to apply a magnetic field to the unloaded magnetic head, thereby fully suppressing changes in output characteristics of the magnetic head while using a member mountable within a limited space in the apparatus without magnetically affecting the other members so much.

In general, a magnetoresistive device includes a free layer whose magnetization direction changes depending on an external magnetic field as a layer for detecting the magnetism of magnetic recording media, and has a multilayer structure constituted by some layers including shield layers disposed on both sides of the free layer. The inventors presume that, when the environmental temperature fluctuates greatly, the state of magnetic domain around the free layer in the multilayer structure is altered, whereby output characteristics of the magnetic head change. Therefore, it seems that, when the magnetic field applying part including a plastic magnet applies a predetermined magnetic field so as to remagnetize materials having the altered magnetic domain state surrounding the free layer, such that the magnetic domain state resumes a predetermined state, output characteristics of the magnetic head can keep a constant state.

When a molding method such as injection molding is employed, the plastic magnet used as the magnetic material can be formed into a member having a size mountable within a limited space in the apparatus and a high dimensional accuracy. While it was considered difficult for a plastic magnet to generate a magnetic field sufficient for remagnetizing a magnetoresistive device since the magnetic force of plastic magnets is weaker than that of permanent magnets or electromagnets in general, studies conducted by the inventors have unexpectedly elucidated that output characteristics of a magnetic head can fully be stabilized by using a plastic magnet. The plastic magnet refers to a magnetic material comprising a resin and magnetic particles dispersed therein.

In another aspect, the present invention provides a magnetic recording apparatus comprising a magnetic disk; a magnetic head, including a magnetoresistive device, for reading information from the magnetic disk; an arm attached to the magnetic head and swings so as to load and unload the magnetic head to or from the magnetic disk; a magnetic field applying part disposed close to the magnetic disk, made of a magnetic material, and formed with a groove for surrounding the magnetic head; and a holding part for holding the arm such that the unloaded magnetic head stays at a position surrounded by the groove; wherein the magnetic material contains a plastic magnet. Preferably, in this magnetic recording apparatus, the groove surrounds the magnetic head such that the magnetic field is applied to the magnetic head in a diametric direction of the magnetic disk.

By applying a magnetic field to the unloaded magnetic head, thus configured magnetic recording apparatus also sufficiently suppresses changes in output characteristics of the magnetic head while using a member mountable within a limited space in the apparatus and restraining the other members from being magnetically affected.

Preferably, in the above-mentioned magnetic recording apparatus in accordance with the present invention, the magnetoresistive device includes a free layer having a magnetization direction variable depending on an external magnetic field, and upper and lower shield layers disposed on both sides thereof, whereas the magnetic field is applied to the unloaded magnetic head such that the upper and lower shield layers are magnetized. This can suppress changes in output characteristics of the magnetic head by a magnetic field having a minimum strength, thereby further restraining the other members from being magnetically affected.

More preferably, the magnetic material further contains a permanent magnet. This makes it easier to set the strength of the magnetic field of the magnetic field applying part to an appropriate range.

DESCRIPTION OF THE PREFERRED EMBODIMENTS

In the following, preferred embodiments of the present invention will be explained in detail with reference to the drawings when necessary. In the explanation, constituents identical to each other will be referred to with numerals identical to each other, whereas overlapping descriptions will be omitted when appropriate.

Figure 1:
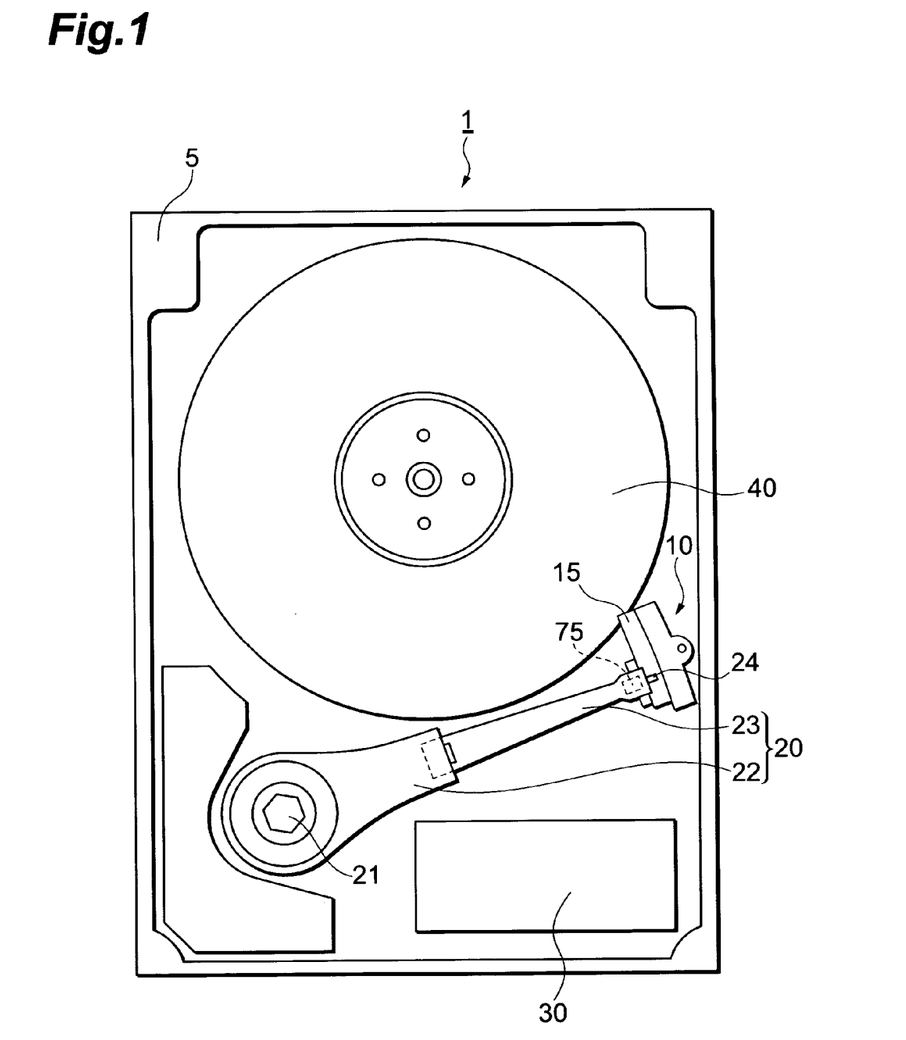
FIG. 1 is a plan view showing an embodiment of the magnetic recording apparatus in accordance with the present invention.

FIG. 1 is a plan view schematically showing an embodiment of the magnetic recording apparatus in accordance with the present invention. The magnetic recording apparatus 1 shown in FIG. 1 has a structure in which a hard disk 40 which is a magnetic disk acting as a magnetic recording medium, an arm 20 having a leading end attached to a magnetic head (not depicted) in a state mounted to a head slider 75, a holding part 10 including a guider 15 for holding the arm 20 by a ramp mechanism, and a controller 30 for regulating various operations such as writing and reading of information with respect to the hard disk 40 are mainly mounted within a housing 5. A plurality of (typically about three) hard disks 40 are stacked in a direction (the depth direction in the drawing) perpendicular to main surfaces thereof The arm 20 comprises a plurality of assemblies each composed of an actuator arm 22 rotatably supported about a shaft 21 by a voice coil motor (VCM) and a suspension 23 made of a planar flexible member are stacked in a direction (the depth direction in the drawing) perpendicular to the main surface of the hard disk 40. The head slider 75 is attached to the suspension 23 so as to oppose the hard disk 40. A tab 24 for riding on the guider 15 is provided as a projection at the leading end of the suspension 23. As the arm 20 swings, the magnetic head attached to the arm 20 is loaded to the hard disk 40 and unloaded from the hard disk 40. Namely, the arm 20, the holding part 10, and the like constitute a load/unload mechanism.

The holding part 10 includes a plurality of guiders 15, on which the tab 24 rides when the arm 20 swings to the outside of the hard disk 40 so as to unload the magnetic head, for holding the arm 20. One guider 15 holds its adjacent two arms 20. A magnetic field applying part for applying a magnetic field to the magnetic head is provided while in a state integrated with each guider 15. Namely, members constituting the holding part 10 partly or wholly act as a magnetic field applying part. Details of the holding part and magnetic field applying part will be explained later.

The magnetic head mounted to the head slider 75 comprises at least a magnetoresistive device for reading information from the hard disk 40, and typically further comprises an inductive electromagnetic transducer or the like for writing the information. As such a magnetic head, one usually employed as a thin-film magnetic head or the like in a magnetic recording apparatus can be used while being mounted to the head slider 75.

The magnetoresistive device in the magnetic head includes a free layer having a magnetization direction variable depending on an external magnetic field, and upper and lower shield layers disposed on both sides thereof Further, a magnetic bias applying layer for temporarily fixing a magnetic domain state of the free layer by applying a magnetic bias to the free layer is provided so as to hold the free layer.

Figure 2:
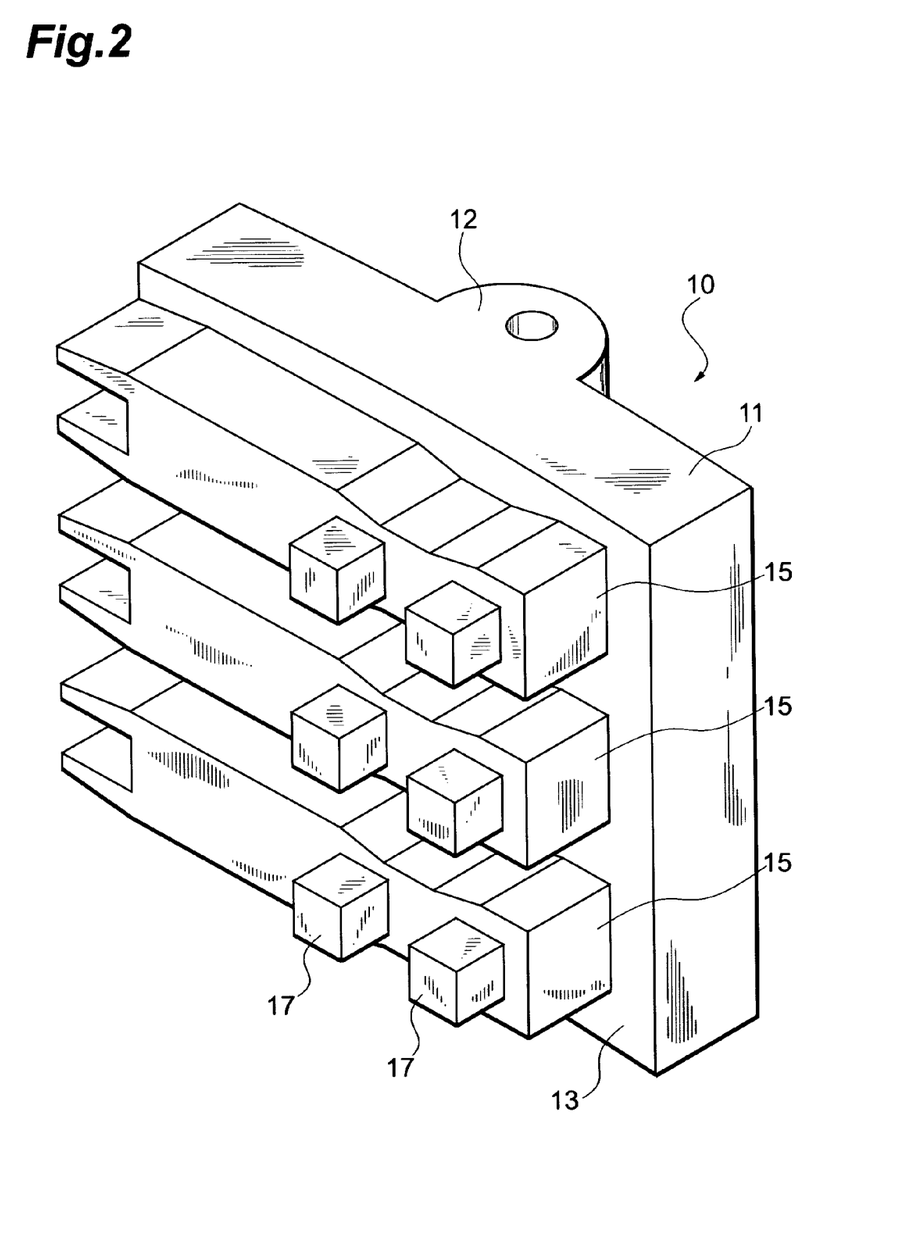
FIG. 2 is a perspective view showing an embodiment of a holding part in the magnetic recording apparatus.
Figure 3:
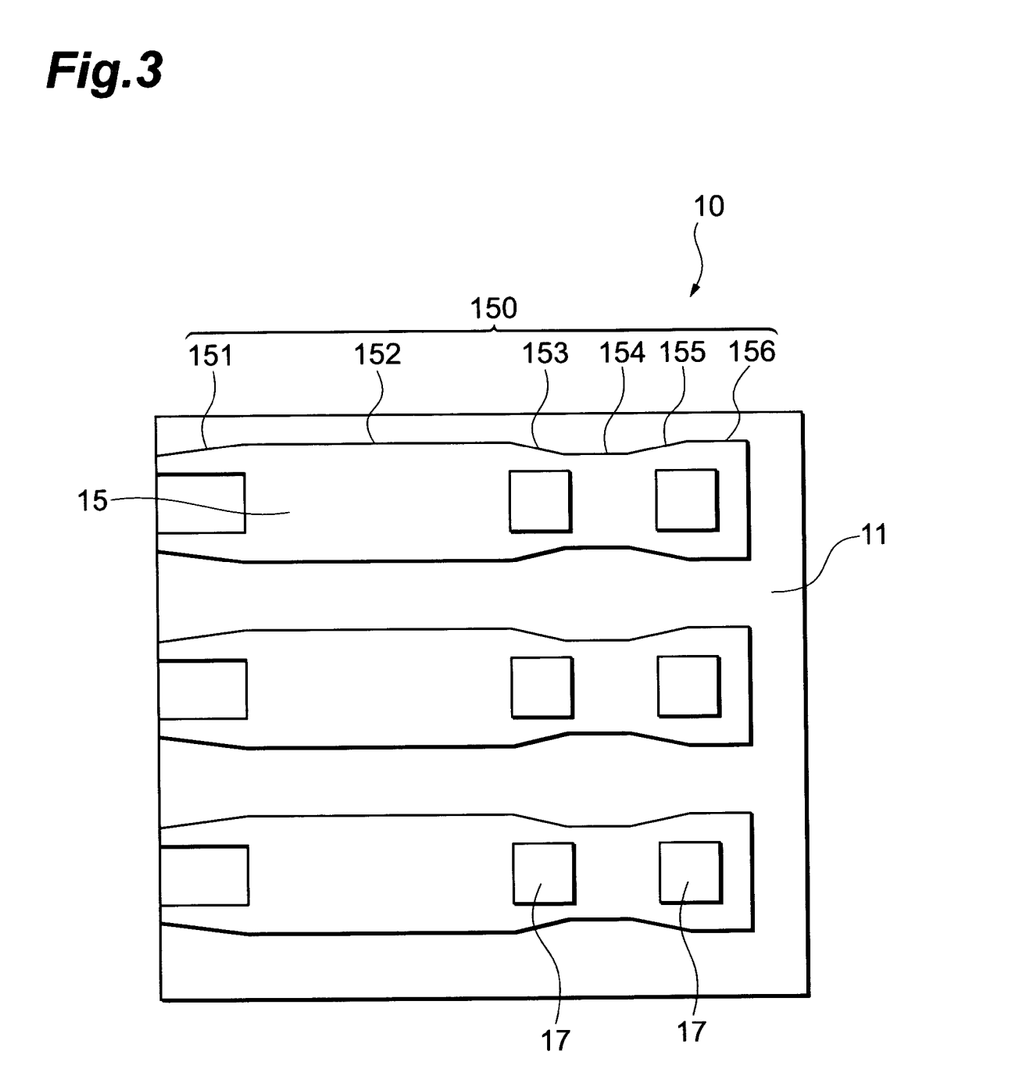
FIG. 3 is a plan view showing the embodiment of the holding part in the magnetic recording apparatus.

With reference to FIGS. 2 and 3, the holding part 10 will now be explained in detail.

FIG. 2 is a perspective view showing the holding part 10. The holding part 10 is constituted by a support 11 having a vertical surface 13 perpendicular to the surfaces of hard disks 40; three guiders 15 arranged in a row on the vertical surface 13; and a fastening part 12, disposed on the surface opposite from the vertical surface 13, for fastening the holding part 10 to the housing 5. The vertical surface 13 has a curved surface which substantially conforms to an orbit in which the leading end part of the arm 20 moves when it swings.

FIG. 3 is a plan view of the holding part 10 as seen from the guider 15 side. Each guider 15 has two holding surfaces 150 provided on both sides thereof for allowing the tab 24 to ride thereon, and a guider vertical surface parallel to the vertical surface 13. When the tab 24 rides on the holding surfaces 150, a restoring force due to the elasticity of the flexed suspension 23 presses the tab 24 against the holding surfaces 150. Each holding surface 150 has a structure in which a first tilted surface 151, a first horizontal surface 152, a second tilted surface 153, a second horizontal surface 154, a third tilted surface 155, and a third horizontal surface 156 are successively arranged in this order, whereas the second tilted surface 153, second horizontal surface 154, and third tilted surface 155 form a groove for keeping the tab 24. The holding part 10 is secured to the housing 5 such that an end part of the first tilted surface 151 is positioned close to the surface of the hard disk 40.

When unloading the magnetic head, the magnetic head swings to the outside (rightward in FIG. 3) of the hard disk 40, whereby the tab 24 initially rides on the holding surface 150 while moving up the first tilted surface 151, subsequently slides on the first horizontal surface 152, and then slides down the second tilted surface 153, so as to reach a position on the second horizontal surface 154. Here, the amount of swinging of the arm is regulated such that the arm stops swinging when the tab 24 reaches a predetermined position on the second horizontal surface 154. When loading the magnetic head, the tab 24 slides on the holding surface 150 in a direction opposite from that mentioned above.

A pair of protrusions 17, 17 are disposed on the guider vertical surface at positions opposing each other across the magnetic head when the arm is held with the tab 24 staying on the second horizontal surface 154. The pair of protrusions 17, 17 are made of a magnetic material, and partly constitute the magnetic field applying part. Namely, the magnetic field is constituted by the pair of protrusions 17, 17; and a part consisted of a magnetic material forming a part or whole of the guider 15. The leading ends of the protrusions 17 form a pair of magnetic poles, whereas the unloaded magnetic head stays at a position held between the pair of magnetic poles.

Each of FIGS. 4, 5, 6, and 7 is a partial sectional view showing a state where a magnetic field applying part applies a magnetic field to the unloaded magnetic head.

Figure 4:
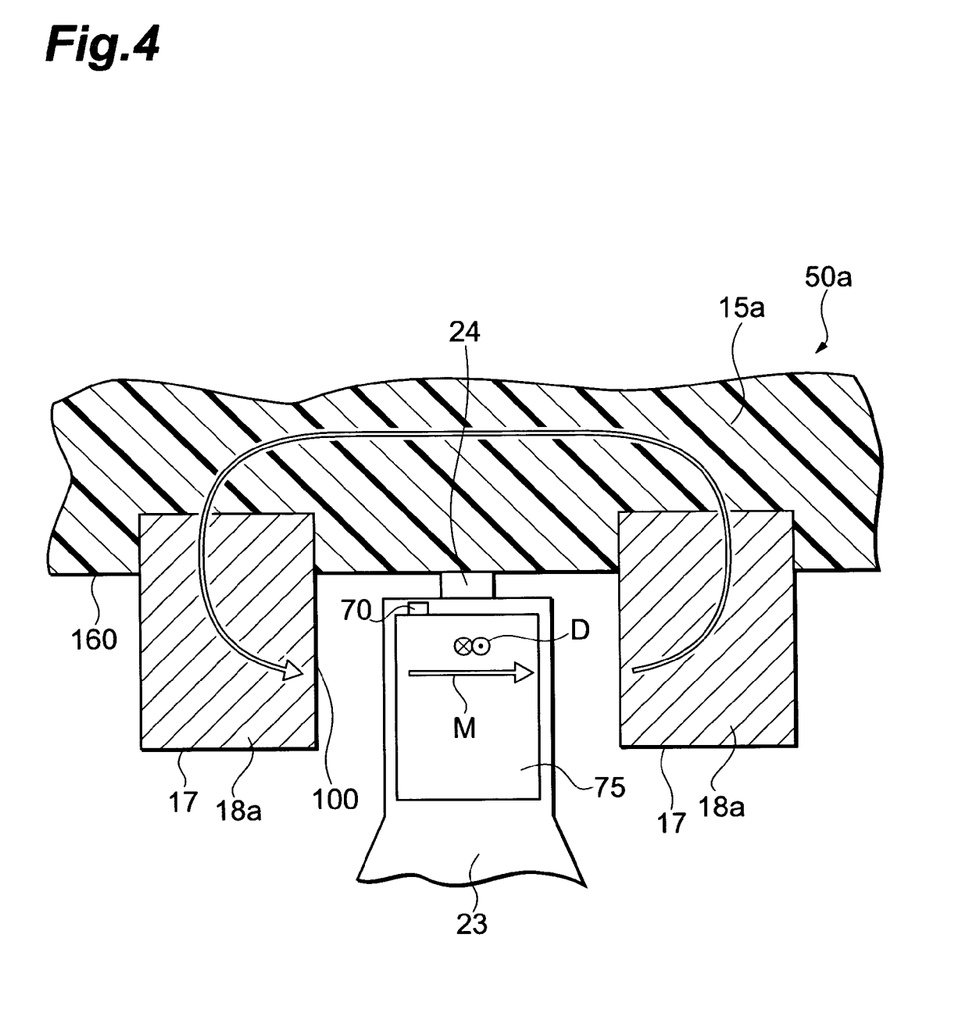
FIG. 4 is a partial sectional view showing a state where a magnetic field applying part applies a magnetic field to a magnetic head.

The magnetic field applying part 50a shown in FIG. 4 is constituted by a guider 15a made of a plastic magnet; and a pair of permanent magnets 18a, 18a, each having a rectangular cross section, opposing each other while in a state fitted into respective holes formed on a guider vertical surface 160 of the guider 15a. Respective parts of the permanent magnets 18a projecting from the guider vertical surface 160 and the part of guider vertical surface 160 positioned therebetween form a groove 100 surrounding a magnetic head 70 mounted to an end part of a head slider 75. Here, the magnetic field applying part 50a forms a magnetic field in a direction indicated by an arrow in the drawing, whereas this magnetic field applies a magnetic field in the direction of arrow M, i.e., substantially in the track width direction. In such a magnetic field applying part, it is not always necessary for the whole guider to be constituted by a magnetic material. It will be sufficient if only regions in the vicinity of the permanent magnets 18a, 18a are constituted by a magnetic material so as to form a magnetic circuit including the protrusions.

The guider 15a having thus configured magnetic field applying part may be obtained, for example, by yielding an article having a form provided with holes for fitting the permanent magnets 18a by injection molding or the like using a plastic magnet, and then fitting the permanent magnets 18a therein. The guider 15a having the permanent magnets 18a fitted therein can be bonded to the support 11, and so forth, so as to yield the holding part 10. Alternatively, a member having a form in which the guider 15a and the support 11 are integrated with each other may be obtained by injection molding or the like using a plastic magnet, and then the permanent magnets 18a may be fitted therein. The molded holding part 11 is mounted within the housing 5 while in a state where the magnetic field applying part 50a is magnetized.

Figure 5:
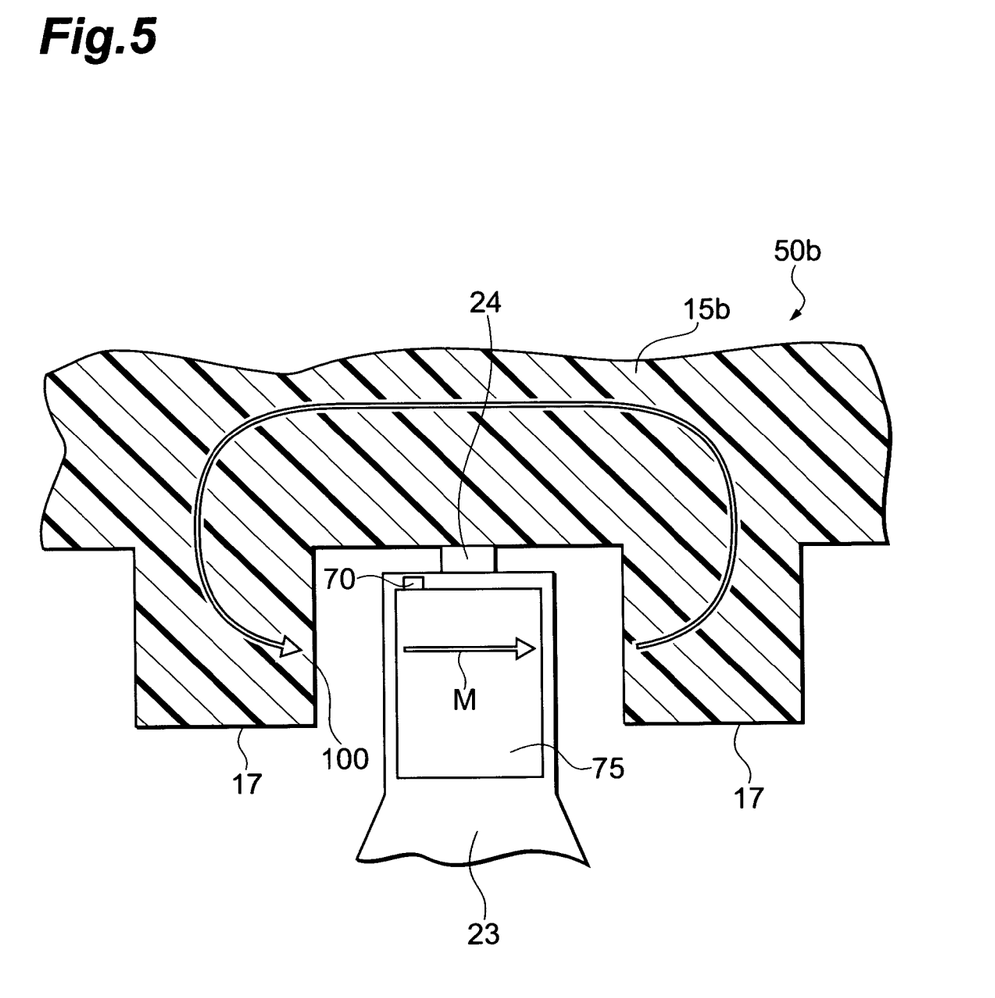
FIG. 5 is a partial sectional view showing a state where a magnetic field applying part applies a magnetic field to a magnetic head.

The magnetic field applying part 50b shown in FIG. 5 is constituted by a guider 15b, made of a plastic magnet, having a pair of opposing protrusions 17, 17 as a whole. A magnetic field in the direction indicated by arrow M in the drawing is applied to the magnetic head 70, since the latter is surrounded with the groove 100 formed by a pair of protrusions 17, 17. The magnetic field applying part 50b (also acting as a guider) can be obtained by injection molding or the like using a plastic magnet.

Figure 6:
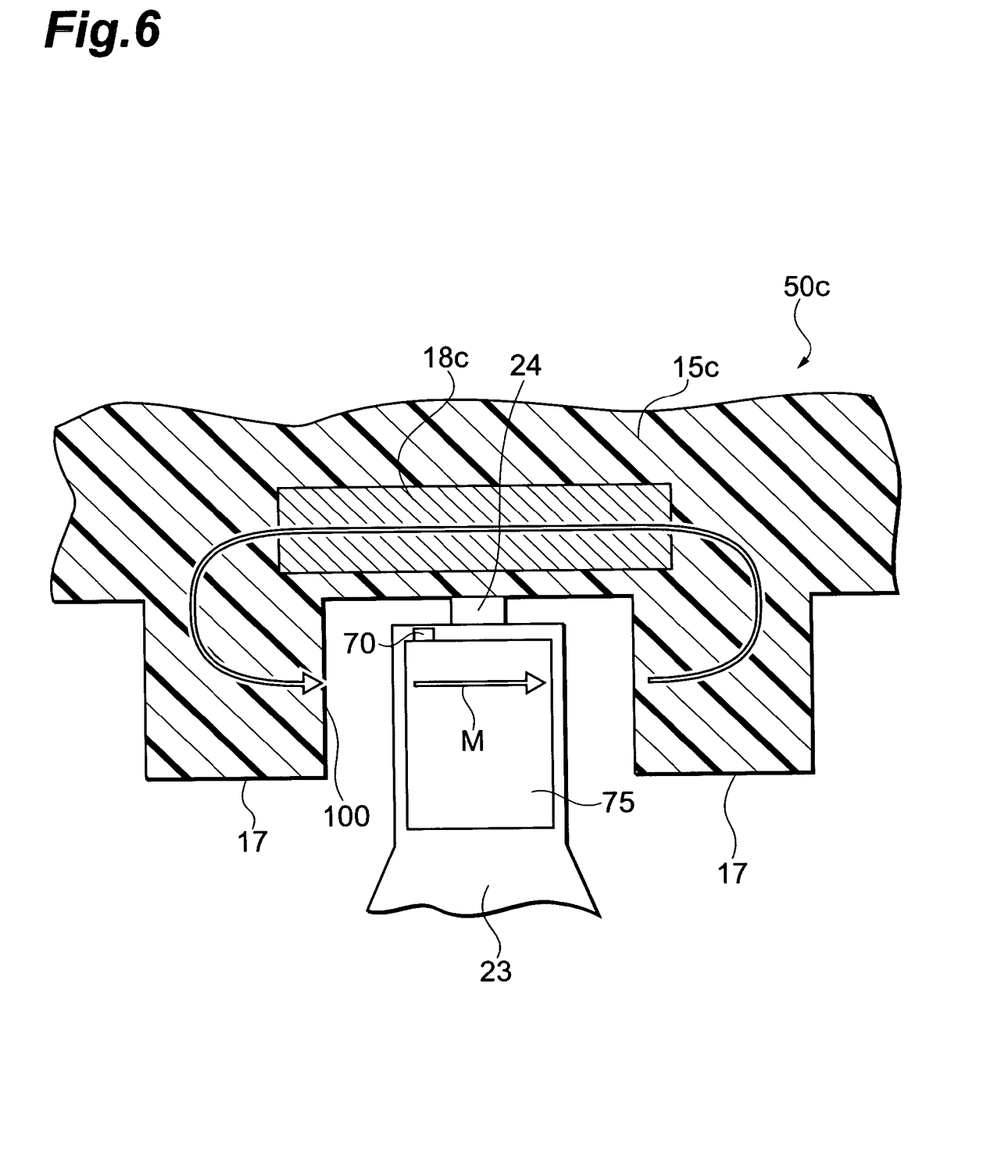
FIG. 6 is a partial sectional view showing a state where a magnetic field applying part applies a magnetic field to a magnetic head.

The magnetic field applying part 50c shown in FIG. 6 is constituted by a guider 15c, made of a plastic magnet, having a pair of opposing protrusions 17, 17 as a whole, whereas a permanent magnet 18c is buried at a position between the pair of protrusions 17, 17. This can form a magnetic field stronger than that formed by the magnetic field applying part 50b shown in FIG. 5. The magnetic field applying part 50c can be obtained, for example, by yielding a guider formed therewithin with a void for fitting a permanent magnet by injection molding or the like using a plastic magnet, and then fitting the permanent magnet 18c therein.

Figure 7:
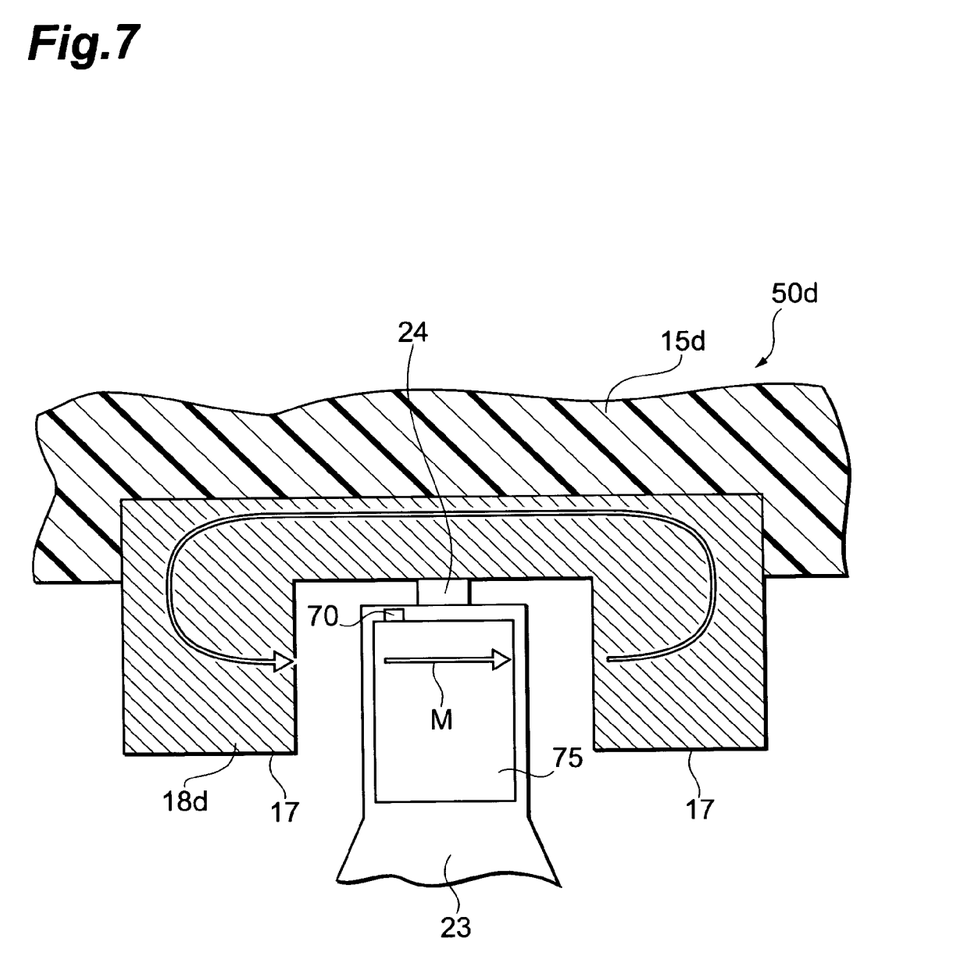
FIG. 7 is a partial sectional view showing a state where a magnetic field applying part applies a magnetic field to a magnetic head.

The magnetic field applying part 50d shown in FIG. 7 is constituted by a guider 15d made of a plastic magnet and formed with a hole, and a permanent magnet 18d fitted into the hole of the guider 15d and formed with a groove 100. The magnetic field applying part 50d can be obtained, for example, by yielding the guider 15d formed with a hole for fitting the permanent magnet 18d by injection molding or the like using a plastic magnet, and then fitting the permanent magnet 18d therein.

The plastic magnet constituting the magnetic field applying parts explained in the foregoing is a magnetic material comprising a resin and magnetic particles dispersed therein. As the resin constituting the plastic magnet, thermoplastic resins are preferred because of their excellence in formability and the like. Among the thermoplastic resins, polyamides (PA6, PA66, PA12, etc.) and polyphenylene sulfide (PPS) are preferred in particular. Examples of materials constituting the magnetic particles include those based on ferrite such as barium ferrite and strontium ferrite, and those based on rare earth elements such as NdFeB.

Examples of commercially available products of such a plastic magnet include "REOLEC/REC/CM" (product name) series and "FB/BQ" (product name) series manufactured by TDK Corporation.

When a permanent magnet is used in combination with a plastic magnet as a magnetic material, a permanent magnet made of an alnico magnet, a rare-earth sintered magnet, or the like, for example, can be used favorably.

Preferably, the magnetic field applying part forms the unloaded magnetic head with a magnetic field having such a strength that the upper and lower shield layers of the magnetoresistive device are magnetized. Preferably, the magnetic field applying part forms a magnetic field having a strength within such a range as to magnetize the upper and lower shield layer but not a magnetic bias applying layer. Specifically, it will be preferred if the strength of the magnetic field formed by the magnetic field applying part is 400 to 1,500 Oe (about 320,000 to 1,200,000 A/m). The effect of stabilizing output characteristics of the magnetic head tends to become weaker when the strength of the magnetic field applied to the magnetic head is less than 400 Oe, whereas magnetic influences on magnetic recording media and the like tend to become greater when the strength of the magnetic field exceeds 1,500 Oe.

When not operating, the magnetic recording apparatus 1 is in a state where a magnetic field is applied to the unloaded magnetic head. Therefore, even when the environmental temperature fluctuates, the state of magnetic domain in the magnetoresistive device in the magnetic head can be kept constant. When a change in output characteristics of the magnetic head is detected during its operation, a control action of once unloading the magnetic head, remagnetizing the magnetic head with the magnetic field applying part, and then loading the magnetic head can be carried out, so as to prevent read errors from occurring during the operation.

The magnetic recording apparatus of the present invention is not restricted to the foregoing embodiments as a matter of course. For example, the groove of the magnetic field applying part may have any form, such as semicircular or V-shaped form. The magnetic field applying part and the holding part may be constructed by members separate from each other.

EXAMPLES

In the following, the present invention will be explained in more detail with reference to examples. However, the present invention is not restricted to the following examples.

Making of a Guider Provided with a Magnetic Field Applying Part

First, an article having an overall shape excluding protrusions 17 from a guider 15 in FIG. 2, while being formed with a pair of holes for fitting permanent magnets, was formed by injection molding using a plastic magnet ("REOLEC" (product name) manufactured by TDK Corporation), and permanent magnets were fitted into the holes, so as to make a guider provided with a magnetic field applying part having the same configuration as that of the magnetic field applying part 50a shown in FIG. 4. Thus obtained guider (magnetic field applying part) was magnetized, and then the strength of the magnetic field within the groove of the magnetic field applying part was measured and found to be 779 Oe. Such a strength of the magnetic field formed by the magnetic field applying part does not seem to affect hard disks magnetically so much as to change their state of magnetic recording.

Example 1

Figure 8:
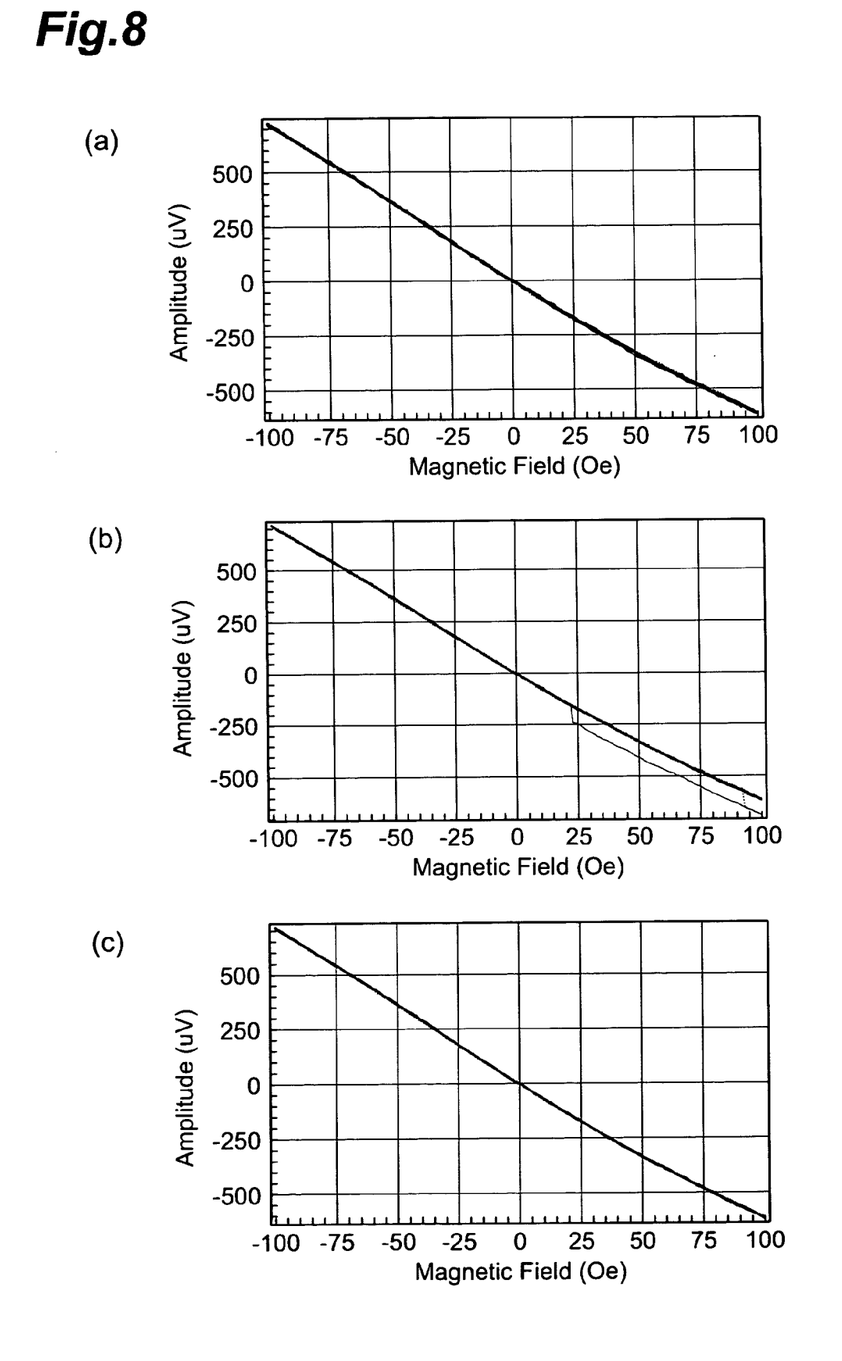
FIG. 8 is a graph showing the relationship between voltage and external magnetic field in a magnetic head.

A magnetic head including a magnetoresistive device was left for 15 hours in an environment at 125° C., so as to apply a temperature stress thereto. A magnetic field in a direction (the direction indicated by D in FIG. 4) perpendicular to the main surface of the head slider 75 was applied to the magnetic head subjected to the temperature stress while changing the strength and polarity from −100 Oe to 100 Oe (first step), and again while changing the strength and polarity from 100 Oe to −100 Oe (second step). At that time, the relationship between the voltage as an output signal of the magnetoresistive device and the strength of the external magnetic field (the relationship between voltage and external magnetic field) was measured. Thereafter, the magnetic head was placed at a position within the groove of the magnetic field applying part made as mentioned above, and a magnetic field having a strength of about 800 Oe was applied thereto, so as to remagnetize the magnetic head. Thereafter, the relationship between voltage and external magnetic field was measured as mentioned above. FIG. 8 shows results of measurement together with the relationship between voltage and external magnetic field before the temperature stress was applied.

In FIGS. 8, (a), (b), and (c) are graphs showing respective measurement results before the temperature stress, after the temperature stress, and after the magnetic field application. In each graph, the ordinate indicates the magnitude of voltage as the output signal of the magnetoresistive device, whereas the abscissa indicates the magnitude of magnetic field applied to the magnetic head. Though a phenomenon in which the magnitude of voltage varied between the first and second steps was seen in a region from about 25 to 100 Oe as shown in the graph of (b), it was verified that the magnetic head having the magnetic field applied thereto restored an output characteristic similar to that of the initial state (the graph of (a)) as shown in the graph of (c).

Example 2

Figure 9:
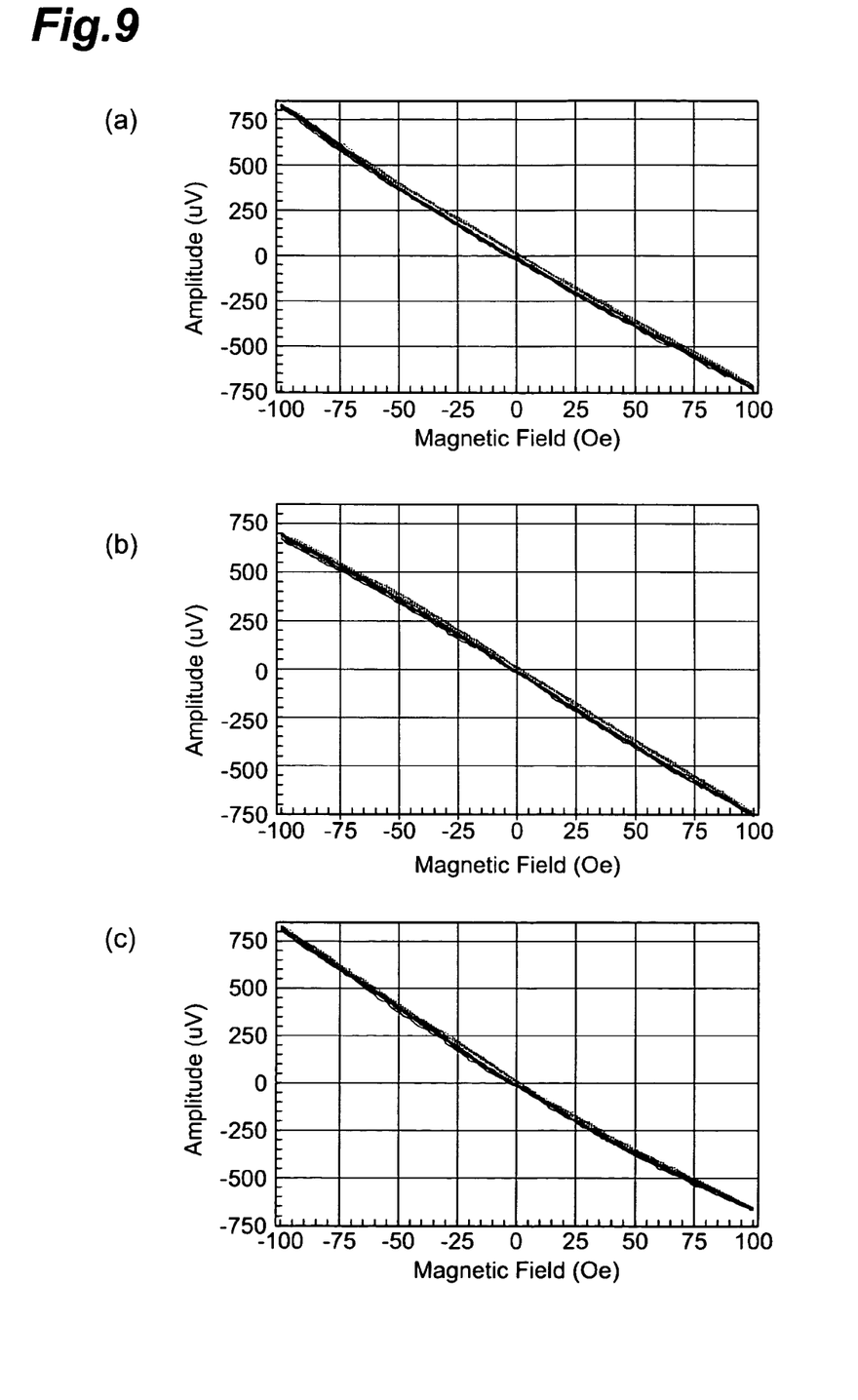
FIG. 9 is a graph showing the relationship between voltage and external magnetic field in a magnetic head.

Using a magnetic head prepared separately from that of Example 1, the same experiment as that of Example 1 was carried out. FIG. 9 shows the results. In this case, the magnitude of voltage decreased from its initial state in a region where the polarity of magnetic field was negative (on the left side of the graph) as shown in the graph of (b) in FIG. 9, whereby the symmetry of output waveforms deteriorated as a whole. However, the magnetic head having the magnetic field applied thereto was seen to restore an output characteristic similar to that of the initial state (the graph of (a)) as shown in the graph of (c).

The present invention provides a magnetic recording apparatus which, while using a member mountable within a limited space in the apparatus, fully suppresses changes in output characteristics of a magnetic head without magnetically affecting the other members so much.

What is claimed is:

1. A magnetic recording apparatus comprising:
   a magnetic disk;
   a magnetic head, including a magnetoresistive device, for reading information from the magnetic disk;
   an arm, attached to the magnetic head, that swings so as to load and unload the magnetic head to or from the magnetic disk;
   a magnetic field applying part disposed close to the magnetic disk, made of a magnetic material, and formed with a groove for surrounding the magnetic head, the magnetic field applying part applying a magnetic field to the magnetic head in a direction such that when the magnetic head is loaded to the magnetic disk, the direction of the magnetic field aligns in a substantially radial direction of the magnetic disk; and
   a holding part for holding the arm such that the unloaded magnetic head stays at a position surrounded by the groove;
   wherein the magnetic material contains a plastic magnet.

2. A magnetic recording apparatus according to claim 1, wherein the magnetoresistive device includes a free layer having a magnetization direction variable depending on an external magnetic field, and upper and lower shield layers disposed on both sides thereof; and
   wherein the magnetic field is applied to the unloaded magnetic head such that the upper and lower shield layers are magnetized.

3. A magnetic recording apparatus according to claim 2, wherein the magnetic material further contains a permanent magnet.

4. A magnetic recording apparatus according to claim 1, wherein the magnetic material further contains a permanent magnet.

* * * * *